(12) United States Patent
Causey et al.

(10) Patent No.: US 7,516,944 B2
(45) Date of Patent: Apr. 14, 2009

(54) SWIVELING AND TILTING ROLLER AXIS FOR WEB GUIDING IN A FIBER PLACEMENT MACHINE

(75) Inventors: Jeffrey W. Causey, Madeira, OH (US); Michael N. Grimshaw, Milford, OH (US); Robert E. Borgmann, Maineville, OH (US)

(73) Assignee: Cincinnati Machine, LLC, Hebron, KY (US)

( * ) Notice: Subject to any disclaimer, the term of this patent is extended or adjusted under 35 U.S.C. 154(b) by 546 days.

(21) Appl. No.: 11/405,784

(22) Filed: Apr. 18, 2006

(65) Prior Publication Data

US 2007/0226956 A1   Oct. 4, 2007

(51) Int. Cl.
*B66D 1/00* (2006.01)
(52) U.S. Cl. ........................................ 254/388
(58) Field of Classification Search ................ 254/388, 254/392–395; 156/361, 574, 433, 441
See application file for complete search history.

(56) References Cited

U.S. PATENT DOCUMENTS

| | | | |
|---|---|---|---|
| 4,068,536 A | 1/1978 | Stackhouse | |
| 4,872,619 A | 10/1989 | Vaniglia | |
| 4,877,193 A | 10/1989 | Vaniglia | |
| 5,022,952 A * | 6/1991 | Vaniglia | 156/441 |
| 5,110,395 A | 5/1992 | Vaniglia | |
| 5,223,072 A | 6/1993 | Brockman et al. | |
| 5,239,457 A | 8/1993 | Steidle et al. | |
| 5,273,614 A | 12/1993 | Grimshaw et al. | |
| 5,698,066 A * | 12/1997 | Johnson et al. | 156/441 |
| 6,112,792 A * | 9/2000 | Barr et al. | 156/441 |
| 6,994,324 B2 | 2/2006 | Harvey et al. | |
| 2006/0249256 A1 * | 11/2006 | Borgmann et al. | 156/425 |

* cited by examiner

*Primary Examiner*—Emmanuel M Marcelo
(74) *Attorney, Agent, or Firm*—Reising Ethington P.C.

(57) ABSTRACT

A fiber placement machine includes a movable wrist with a fiber placement head at one end of the wrist. A roller system for delivering fibers to the fiber placement head includes a J-axis roller located spaced from the ends of the wrist, a K-axis roller at the end of the wrist that supports the head, and an A-axis roller at the opposite end of the wrist. The axis of the K-axis rollers swivel depending on the rotation of the head, and the A-axis rollers swivel as a function of the swiveling of the K-axis rollers. As the A-axis rollers swivel, at least one end of the A-axis roller is displaced toward the J-axis roller to maintain a constant path length for the fiber tows between the A-axis roller and the J-axis roller.

19 Claims, 8 Drawing Sheets

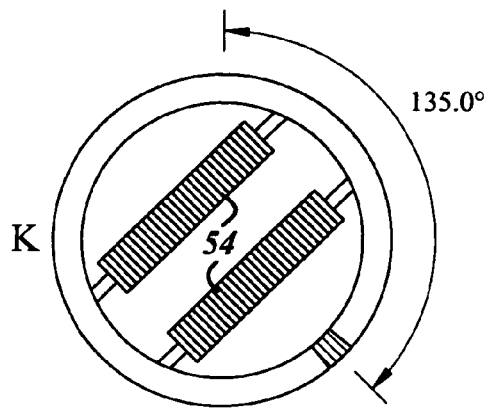
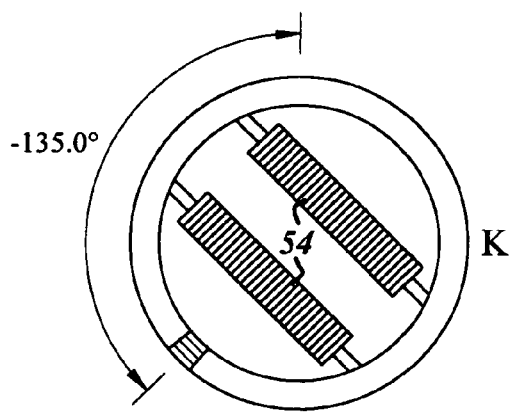
*FIG. 4A*  *FIG. 5A*
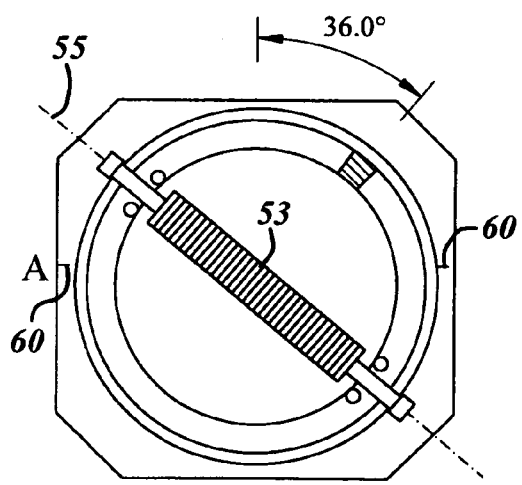
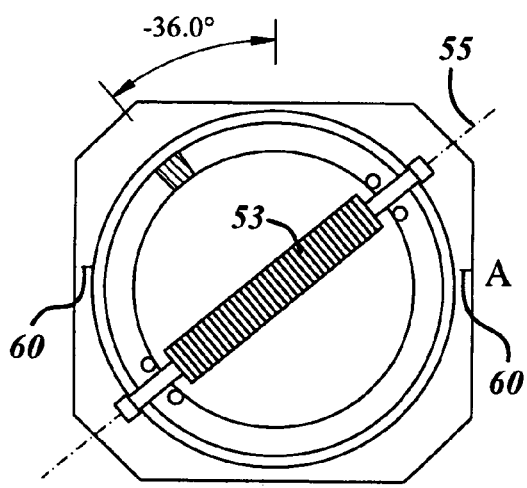
*FIG. 4B*  *FIG. 5B*
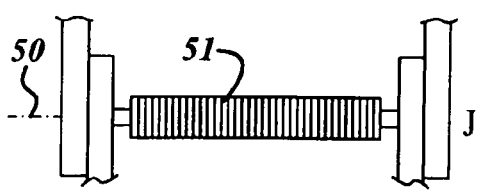
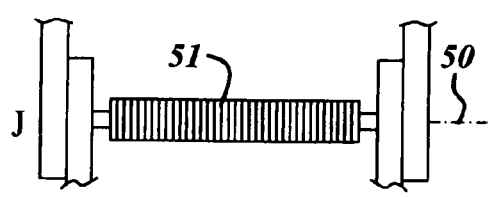
*FIG. 4C*  *FIG. 5C*

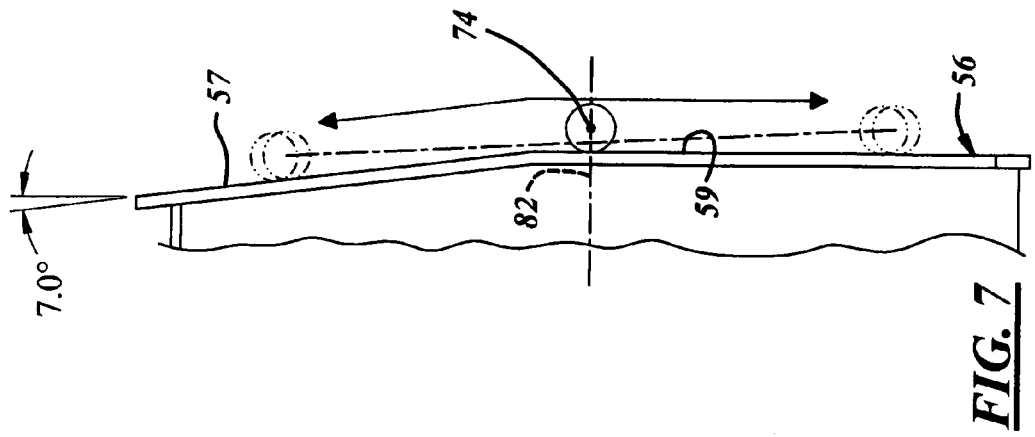
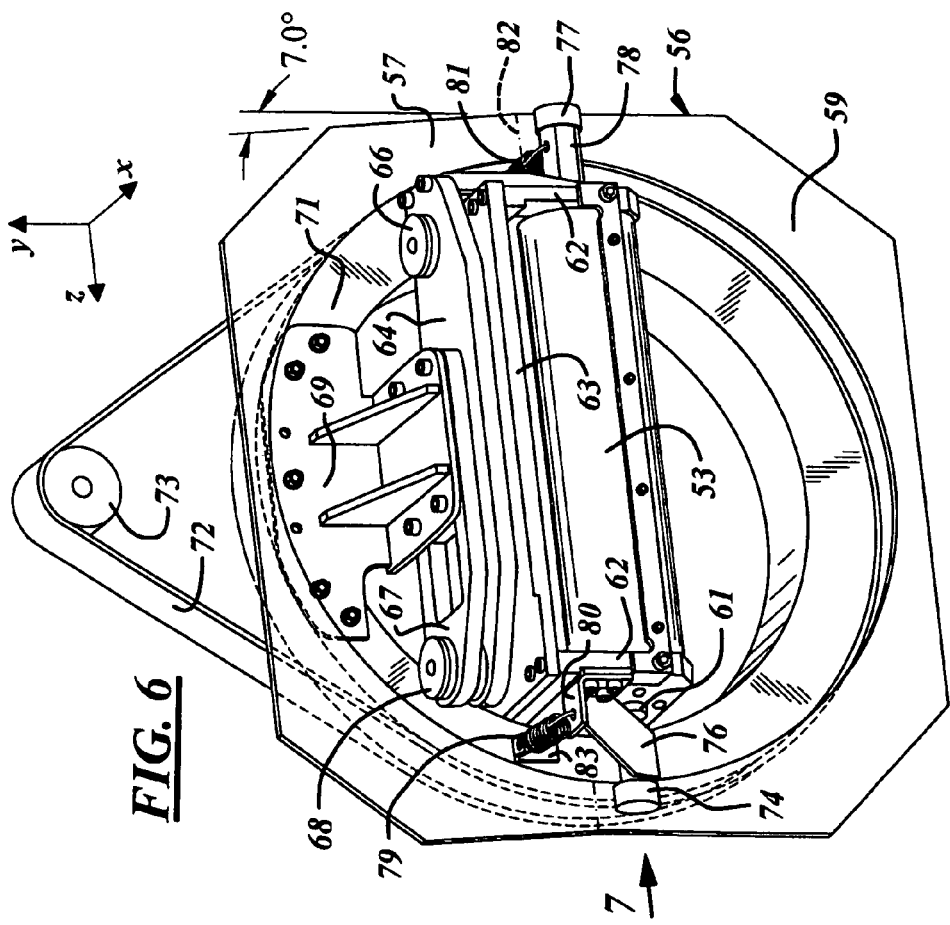

SWIVELING AND TILTING ROLLER AXIS FOR WEB GUIDING IN A FIBER PLACEMENT MACHINE

FIELD OF THE INVENTION

The invention relates to web guiding in a fiber placement machine in which the A-axis rollers swivel and tilt to lessen the change in the web path length as a result of motion of the fiber placement head.

BACKGROUND OF THE INVENTION

Fiber placement machines are well known in the art. Such machines are shown by U.S. Pat. Nos. 5,223,072 for an Intelligent Servo Controlled Fiber Placement Machine Tensioner, and 4,872,619 for a Servo Driven Redirect Roller Apparatus for Fiber Placement Machine. Such machines are used to lay fiber tows onto a form or tool in order to construct a fiber composite part. Such parts are used in the aircraft and aerospace industries because of their high strength and low weight. Fiber placement machines use a creel to supply fiber tows to a fiber placement head which applies the fiber to the tool. A fiber path is provided between the creel and the head to allow fiber bundles to be fed from the creel to the head without overlapping one another or becoming abraded in the guides or rollers of the machine. The fiber placement head is mounted on the end of an arm and a wrist joint is provided between the arm and head to allow the head to swivel to the desired position in order to lay the fibers on the tool.

Three sets of rollers are positioned in the wrist to control the path of the fiber tows between the end of the arm and the fiber placement head and to maintain the fibers in the proper position relative to one another. The J-axis rollers are located along the middle section of the wrist and direct fibers coming from the lower part of the wrist to the end of the wrist that is opposite the fiber placement head. The A-axis rollers are located at the end of the wrist that is opposite the fiber placement head and are used to reverse the direction of the fibers coming from the J-axis rollers so that the fibers are directed to the head. The K-axis rollers are located at the end of the wrist adjacent the head and direct the fibers from the A-axis rollers to the fiber handling mechanism in the head.

The wrist joint is capable of rotary motion about the X, Y, and Z axes of the machine. Depending on the shape of the part and the stresses to which the laid-up part will be subjected, the tape head is oriented to a selected angular position for each of its passes over the tool in order to place the fiber on the tool in the desired orientation.

Recently, applications have arisen for fiber placement machines that require the head to rotate 155 degrees to either side of a Home-position, or 310 degrees in total. Such extreme rotary motion of the head places demands on the fiber delivery system and can cause adjacent tows to rub against one another and chafe, or curl and roll onto themselves as they pass over the rollers.

The rotary motion of the head also changes the path length of the fibers from the creel to the head, and tensioners are used on each of the spools in the creel to compensate for path length change. The tensioners must pay out or rewind the material on the spools in the creel in order to maintain the proper tension on the tows as the fiber placement head moves through different positions and orientations. The less the path length changes, the less manipulation is required by the tensioners in the way of acceleration, deceleration and reversal of the spools.

Minimizing path length change also improves other problems associated with having the tensioners rewind material onto the spools. The first time the fiber is payed out from the spools, a backing film that is coated with a release material is stripped off. If the fiber then has to be rewound onto the spools, it is rewound without any release material in between adjacent layers, causing the fiber to stick to itself.

Additionally, the original "spiral" winding of the fiber on the spool cannot be duplicated when rewinding. As a result, rewound material will tend to be stacked upon itself, increasing the possibility of roped tows or clumping.

Each of the above problems associated with changing the path length of the fibers is exacerbated if the width of the fiber band is increased, and in order to meet increased production rates, the width of the fiber band in modern machines is twice that of older machines.

Accordingly, it would be desirable to provide a fiber placement machine with a fiber tow path including J, A, and K-axis rollers in the wrist that would allow increased manipulation of the fiber placement head without damaging the tows and while keeping the changes in fiber path length to a minimum.

BRIEF DESCRIPTION OF THE SEVERAL VIEWS OF THE DRAWINGS

FIGS. 4A-4C show the K, A, and J-axis rollers rotated clockwise from the Home-position.

FIGS. 5A-5C show the K, A, and J-axis rollers rotated counterclockwise from the Home-position.

FIG. 6 is a perspective view of the A-axis roller and a cam plate.

FIG. 7 is a side view of the cam plate of FIG. 6.

BRIEF SUMMARY OF THE INVENTION

The wrist in a fiber placement system uses a swiveling and tilting A-axis roller for guiding the fiber tows. The swiveling and tilting A-axis roller allows the natural path of the tows around the roller to be maintained as the head rotates to orient fibers on a form or tool. As the A-axis rollers swivel to follow the rotation of the head, the A-axis rollers additionally tilt forward, out of the plane of swiveling, to improve fiber delivery. As a result, the portion of the A-axis rollers which tilts toward the J-axis remains approximately equidistant from the J-axis rollers that feed the fiber tows to the head. Maintaining the distance between the A-axis rollers and the J-axis rollers substantially constant minimizes the change in path length for the tows as a result of head motion.

DETAILED DESCRIPTION OF INVENTION

Figure 1:
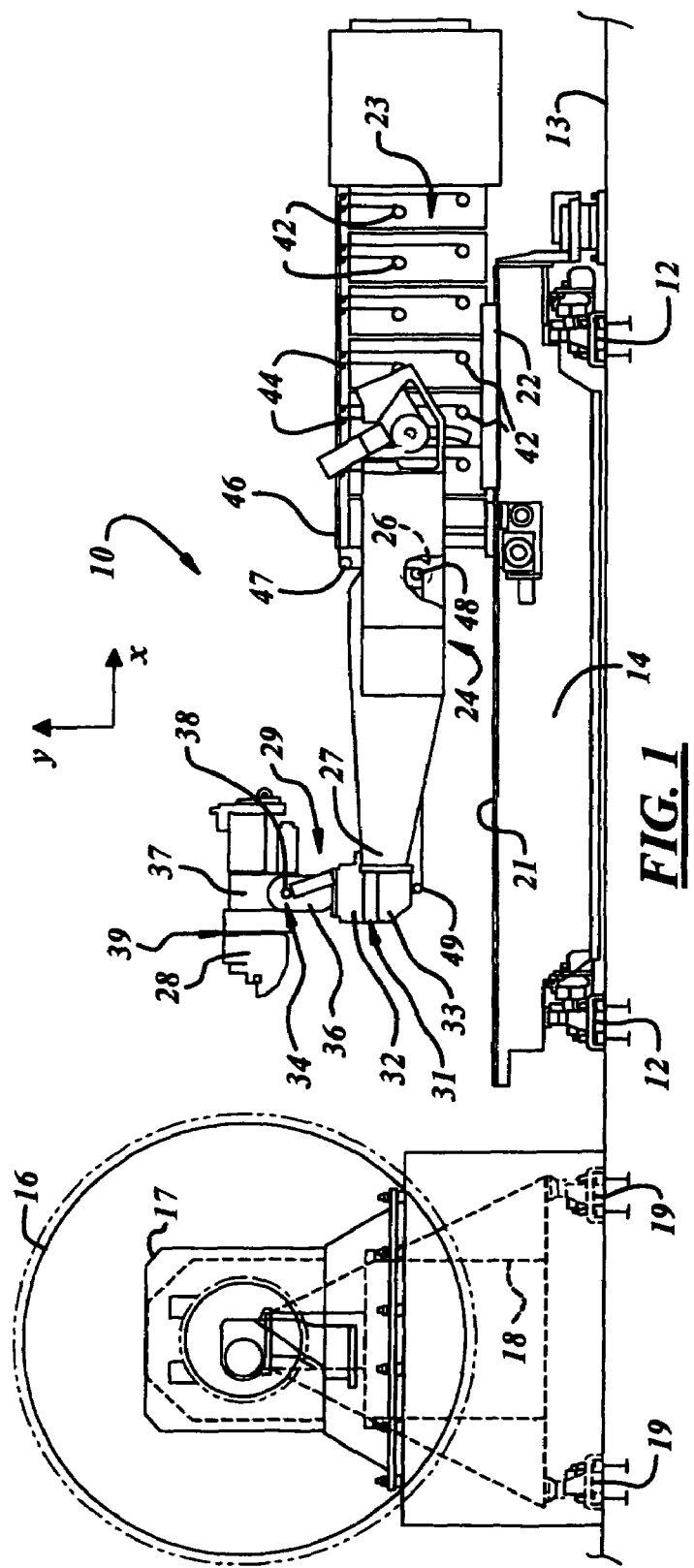
FIG. 1 is an overall view of a fiber placement machine.

FIG. 1 shows a typical fiber placement machine 10. The machine comprises a pair of parallel carriage rails 12 mounted on a suitable support 13 such as a factory floor. The rails extend in the Z-direction, perpendicular to the plane formed by the X and Y-axes. A carriage 14 is slideably mounted on the rails 12 for movement in the Z-direction, parallel to the longitudinal axis of a tool or form 16. The tool 16 is supported by a headstock 17 and a tailstock 18 so that it may be rotated about an axis that is parallel to the Z-axis. The headstock 17 and the tailstock 18 may be mounted on rails 19 for movement in the Z-direction.

The carriage 14 carries a pair of parallel cross slide rails 21 that extend parallel to the X-axis and which support a cross slide 22 for movement toward and away from the tool or form 16. The cross slide 22 carries a creel 23 and a tilt-type arm 24. The arm 24 is attached to the cross slide 22 by a Y-axis pivot 26 at one end so that the free end 27 of arm 24 may move vertically in the Y-direction with respect to the cross slide 22. Carriage 14, cross slide 22 and arm 24 provide general position location for the free end 27 of the arm 24.

A fiber placement head 28 is attached to the end of arm 24 by a wrist mechanism 29 that generally provides orientation for the fiber laying head 28 with respect to the free end 27 of arm. The head may 28 include a cut, clamp and restart mechanism for cutting the fibers at a desired location on the part which is being laid up and restarting the fibers at another location on the part as required. U.S. Pat. No. 5,110,395 for a Fiber Placement Head shows the typical fiber handling mechanisms found in a fiber placement head.

Yaw movement for the fiber laying head 28 (rotation about the vertical Y-axis) is provided by a yaw joint 31 comprising a upper rotary portion 32 that rotates relative to a lower fixed housing 33 that is attached to the free end 27 of arm 24.

Pitch movement for the fiber laying head 28 (rotation about the horizontal Z-axis) is provided by a pitch joint 34. The lower portion 36 of the pitch joint 34 is attached to the upper rotary portion 32 of the yaw joint 31 and upper portion of the pitch joint comprises the K-axis drive housing 37.

Figure 2:
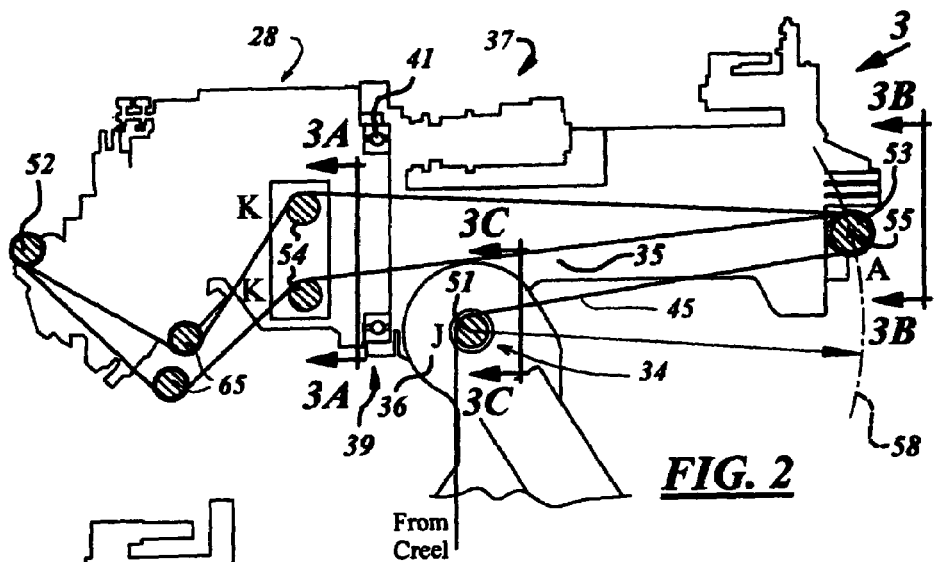
FIG. 2 is a diagrammatic view of a fiber placement head and the A-axis drive housing.

Roll movement for the fiber laying head 28 (rotation about the longitudinal axis of the K-axis drive housing 37) is provided by a roll joint 39 that comprises a roll bearing 41 as shown in FIG. 2. The roll bearing 41 is mounted on the end of the K-axis drive housing 37, and supports the fiber placement head 28.

A supply of fiber tows is carried on individual spools 42 which are mounted in the creel 23. The individual spools 42 are coupled to tensioner modules (not shown) that maintain the correct tension on individual fiber tows as the fiber is paid out to the head 28 and as the head changes its orientation to apply fiber to the tool 16. Fiber from the spools 42 is led through individual sensor guides 44 and the fibers are arranged into a band or web 46 that passes over a creel redirect roller 47 that is mounted on the end of the creel 23. The fibers pass from the creel redirect roller 47 to a second redirect roller 48 that is mounted concentric with the Y-axis pivot 26. The fibers then pass from the second redirect roller 48 to a third redirect roller 49 located beneath the yaw axis 31, and from the third redirect roller 49 to the J-axis roller 51 located tangent to the pitch axis 34 as shown in FIG. 2.

Although the term "roller" is used herein to describe the J, A, and K-axis rollers, other rollers in the fiber placement head, and the various redirect rollers, it will be understood by those skilled in the art that such rollers may comprise a series of individual roller elements arranged next to one another to form a single roller. The roller elements may be separated by spacers to keep side-by-side tows in the proper spatial relationship relative to one another, and may be mounted on a common shaft or a segmented shaft as desired. Such rollers are shown in U.S. Pat. No. 4,872,619 listed above as well as in U.S. Pat. No. 4,877,193 for a Redirect Roller Apparatus for Fiber Placement Machine, U.S. Pat. No. 5,239,457 for Redirect Roller Control for Fiber Placement Machine, and U.S. Pat. No. 5,273,614 for a Tow Guide for Redirect Rollers in a Fiber Placement Machine. Hence, the terms roller and rollers are used interchangeably herein to refer to solid or segmented rollers mounted on a common or segmented shaft.

FIG. 2 is a diagrammatic side view of a fiber placement head 28 and the K-axis drive housing 37 showing the path of the fiber tows 45 from the J-axis roller 51 that is tangent to the pitch axis 34 to the compaction roller or shoe 52. The fiber tows 45 proceed from the J-axis roller 51 to the A-axis roller 53 located at the rear of the K-axis drive housing 37. From the A-axis roller 53, the fiber tows 45 proceed to the K-axis rollers 54 mounted in the head, and from the K-axis rollers 54 to another set of redirect rollers 65 and to the compaction roller or shoe 52. Depending on the design of the fiber placement head 28, the K-axis roller 54 may comprise a single roller or two parallel rollers 54 of which each receives one-half of the fiber tows coming from the A-axis roller 53. If two K-axis rollers 54 are used, the fiber tows are recombined into a single band or web at or in advance of the compaction roller or shoe 52.

The K-axis rollers 54 are mounted on the fiber placement head 28 and thus are subjected to the same rotating (roll) motion around the X-axis as the head. In this example, the head 28 is capable of a roll motion of plus or minus 155 degrees around the X-axis from a Home-position in which the K-axis rollers are horizontal. The axis 55 of the A-axis roller 53 swivels about the roll axis by an amount which is a function of the swiveling of the K-axis rollers 54. Typically, the swiveling of the K-axis rollers 54 is between two and five times as great as the swiveling of the A-axis rollers 53. In a presently preferred embodiment, the ratio of the swiveling of the K-axis roller to the A-axis roller is 3.75 to 1. For example, if the K-axis rollers 54 swivel 135 degrees, the A-axis roller 53 swivels 36 degrees. The J-axis roller 51 is fixed, and as a result, the axis 50 of the J-axis roller does not swivel as the fiber placement head 28 rotates, but remains parallel to the sweep of the yaw axis.

Figure 3A:
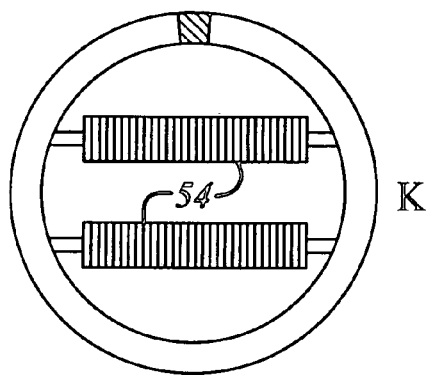
FIGS. 3A-3C show the K, A, and J-axis rollers in the Home-position.
Figure 3B:
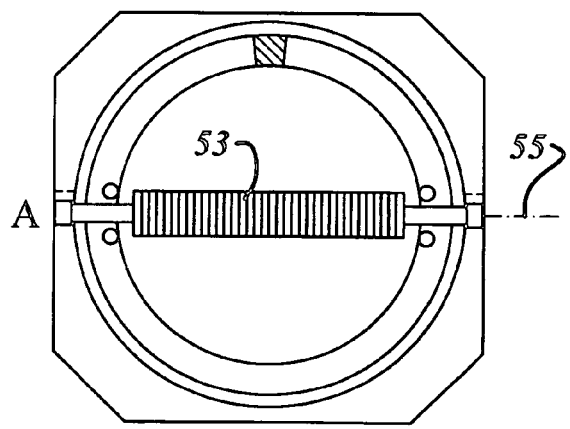
Figure 3C:
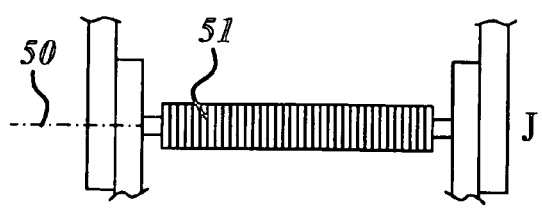

FIGS. 3A, 3B, and 3C are views taken along lines 3A, 3B and 3C, respectively, of FIG. 2 showing the relative positions of the J-axis roller 51, the A-axis roller 53, and the K-axis roller 54 when the fiber placement head 28 is in the Home-position. In this position, the rollers 51, 53, and 54 are parallel to one another, and are horizontal.

FIGS. 4A-4C show the relative positions of the J-axis roller 51, the A-axis roller 53, and the K-axis rollers 54 when the K-axis rollers have swiveled clockwise 135 degrees from the Home-position. In order to accommodate this rotation, the A-axis roller 53 swivels clockwise 36 degrees. In this orientation, as shown in FIG. 4B, the left end of the A-axis roller 53 is above the Home-position 60, and the right end of the A-axis roller is below the Home position 60. The J-axis roller 51 remains in the horizontal position.

FIGS. 5A-5C show the relative positions of the J-axis roller 51, the A-axis roller 53 and the K-axis rollers 54 when the K-axis rollers have swiveled counterclockwise 135 degrees from the Home-position. In order to accommodate this rotation, the A-axis roller 53 swivels counterclockwise 36 degrees. In this orientation, as shown in FIG. 5B the left end of the A-axis roller 53 is below the Home-position 60, and the right end of the A-axis roller is above the Home position 60. The J-axis roller 51 remains in the horizontal position.

Referring again to FIG. 2, it has been determined that in order to provide optimum handling of the individual tows, the distance between the J-axis roller 51 and the A-axis roller 53 should be kept as nearly constant as possible as the A-axis rollers swivel out of the Home-position. In order to do this, as one end of the A-axis roller swivels 53 above the Home-position, it also tilts toward the J-axis roller 51. The amount of tilt is determined by the distance between the J-axis roller 51 and the A-axis roller 53. As shown in FIG. 2, an arc 58 may be drawn through the A-axis roller 53 using the J-axis roller 51 as the center of rotation. The path of the arc 58 above the center of the A-axis roller 53 describes the ideal path of travel of the end of the A-axis roller as it swivels above the Home-position.

Figure 8:
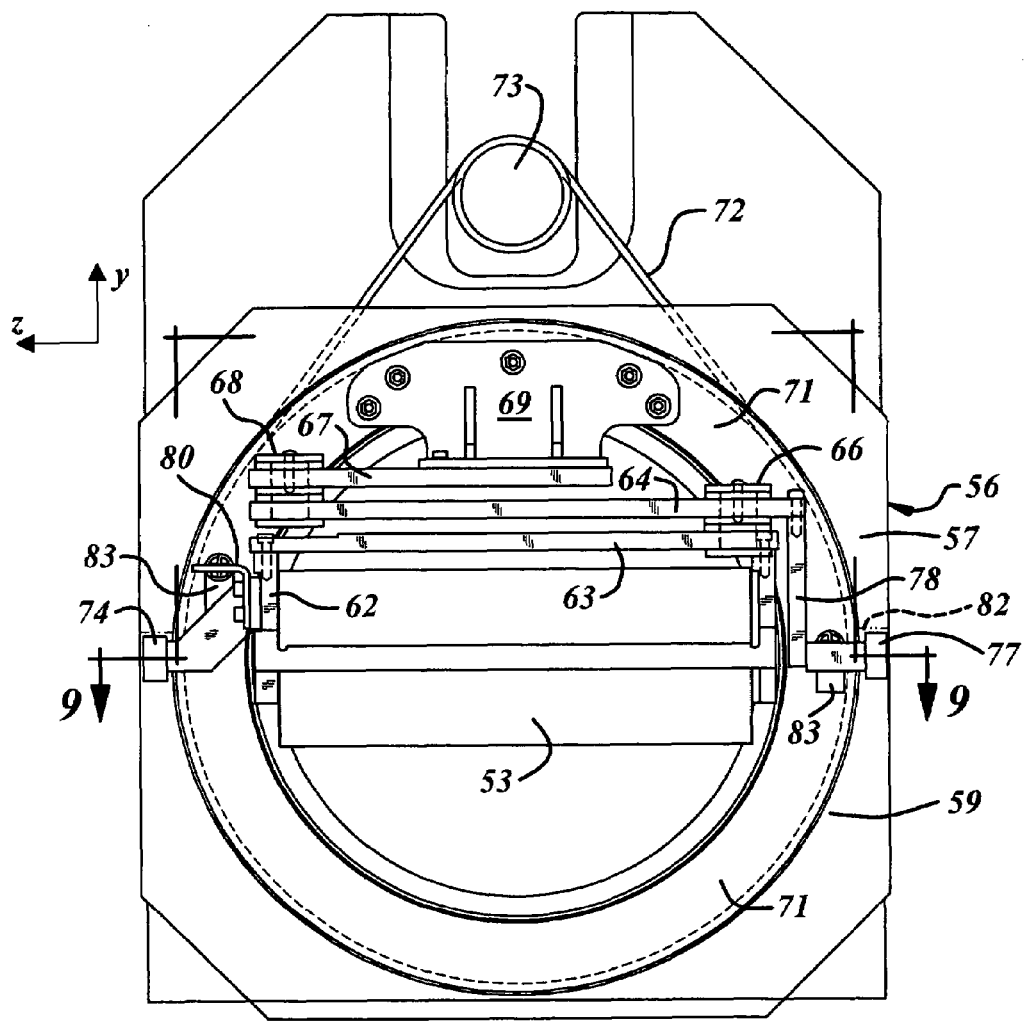
FIG. 8 is an end view of the A-axis roller and cam plate of FIG. 6.

FIGS. 6 and 8 show in detail the mounting of the A-axis roller 53. The A-axis roller 53 is mounted on a roller shaft 61 that is supported by two side plates 62. The side plates 62 are mounted on opposite ends of a lower pivot plate 63 that is coupled to a center pivot plate 64 by a lower pivot 66. The center pivot plate 64 is coupled to an upper pivot plate 67 by an upper pivot 68. The upper pivot plate 67 is mounted to a support bracket 69 that is attached to a cylindrical sprocket 71. The cylindrical sprocket 71 is supported for rotary motion and can be rotated by a drive belt 72 that is driven by a drive wheel 73. A left side cam roller 74 is mounted on the end of a left side roller bracket 76 that is attached to the left end of the left side plate 62. A right side cam roller 77 is mounted on the end of a right side roller bracket 78 that is attached to the right end of the center pivot plate 64. A left side tension spring 79 is attached to a left spring bracket 80 that is mounted on the left side plate 62, and a right side tension spring 81 is attached to the right side roller bracket 78. Each of the tension springs are attached at their opposite ends to spring attachment points 83 on the sprocket 71.

In order to accomplish the tilting of the A-axis roller 53, a cam plate 56 is used to control the position of the A-axis roller 53 when the A-axis roller swivels out of the Home-position. The cam plate 56 has an upper cam surface 57 which is designed to impart a compound motion to the A-axis roller 53 as it swivels above of the Home-position.

As best seen in FIG. 8, the cam plate 56 surrounds the sprocket 71 and the cam rollers 74, 77 are guided by the upper and lower cam plate surfaces 57, 59. The lower cam plate surface 59 is below the horizontal centerline 82 of the cam plate and is normal to the axis of K-axis rotation. The upper cam plate surface 57 is above the horizontal centerline 82 of the cam plate 56 and is inclined toward the J-axis relative to the lower portion 59. In practice, it has been found that the upper portion 57 of the cam plate may be inclined at between 5 and 10 degrees to the bottom portion of the cam plate, and that in one presently preferred embodiment of the invention, the inclination may be 7 degrees.

The tension springs 79 exert a pull on the respective A-axis roller mounting hardware to which they are attached, and bias the cam rollers 74, 77 against the cam surfaces of the cam plate 56. In operation, and as best seen in FIG. 7, as the sprocket 71 rotates, the cam rollers 74, 77 follow the contour of the cam surfaces 57 and 59 and orient the A-axis roller 53 accordingly. The cam rollers 74, 77 may be formed with a crowned peripheral surface to form an increased contact area with the surface of the cam plate 56 as the A-axis roller 53 swivels out of the Home-position.

Although the upper portion 57 of the cam plate 56 is shown as being planar, it may also be formed to be curved, to have a shape which more closely conforms to an arc which is drawn through the A-axis roller using the J-axis roller as the center of rotation.

It has further been determined that only the end of the A-axis roller 53 which moves above the Home-position 82 should tilt toward the J-axis roller 51. The end of the A-axis roller which moves below the Home-position 82 moves in a straight line in a path that is normal to the K-axis of rotation. As a result, the lower portion 59 of the cam surface 56, the portion of the cam surface that is below the Home-position, is normal to the K-axis of rotation.

Figure 9:
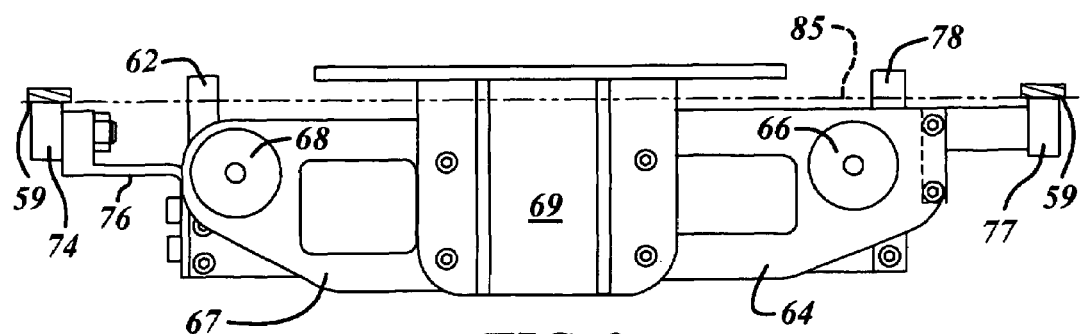
FIG. 9 is a top view of the A-axis roller and cam plate of FIG. 8.

FIG. 9 is a view taken along lines 9-9 of FIG. 8 showing the cam rollers 74 and 77 when the A-axis roller is in the Home-position. A reference line 85 is drawn to show the plane that is defined by the lower portion 59 of the cam plate 56. Both cam rollers 74 and 77 are resting on the lower portion 59 of the cam plate 56 and are aligned with the reference line 85. As a result, the A-axis roller is parallel to the reference line 85.

Figure 10:
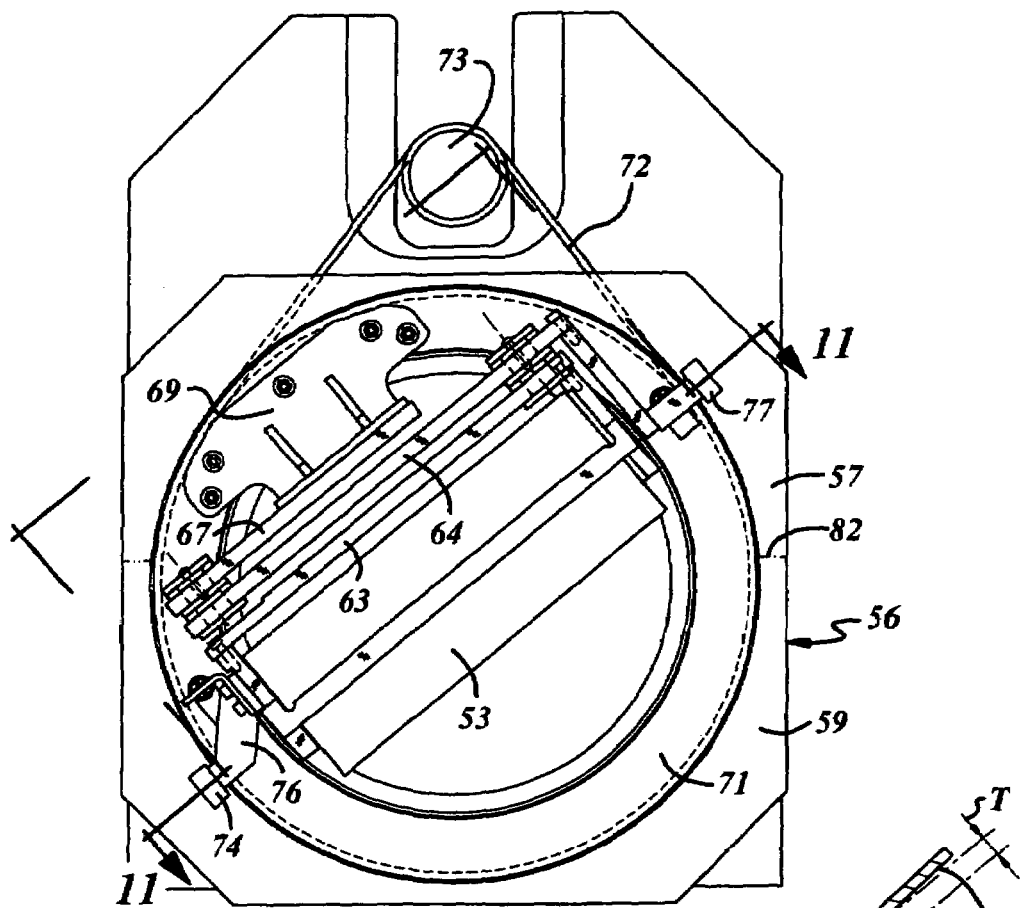
FIG. 10 is an end view of an A-axis roller rotated counterclockwise from the Home-position.

FIG. 10 is a front view of the A-axis roller 53 and the A-axis roller support hardware showing the A-axis roller when it is rotated counterclockwise approximately 37 degrees. With the A-axis roller rotated to this position, the left side cam roller 74 is below the centerline 82 of the cam plate 56 and is supported on the lower cam surface 59. The right side cam roller 77 is above the centerline 82 of the cam plate 56 and is supported on the upper cam surface 57.

Figure 11:
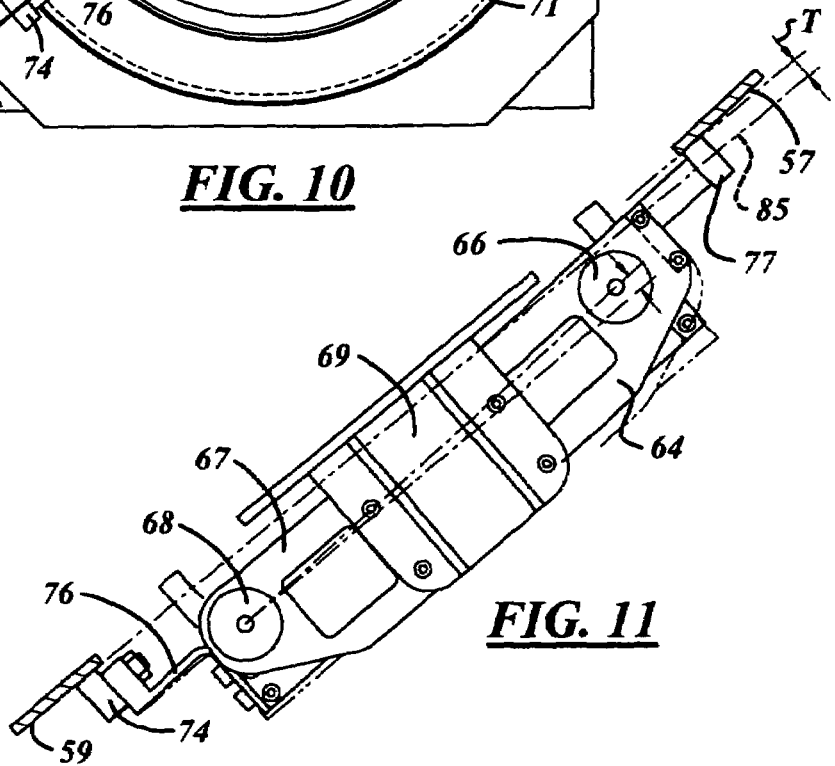
FIG. 11 is a top view of the A-axis roller of FIG. 10.

FIG. 11 is a view taken along lines 11-11 of FIG. 10 showing the cam rollers 74 and 77 when the A-axis roller is in the position shown in FIG. 10. The left side cam roller 74 is resting on the lower portion 59 of the cam plate 56, and the right side cam roller 77 is resting on the upper portion 57 of the cam plate 56. The upper portion 57 of the cam surface that supports the right side cam roller 77 is shown spaced from the reference line 85 designating the plane of the lower surface 59. The right side roller 77 is displaced from the plane of the lower surface 59 by an amount T, creating a tilt of the right end of the A-axis roller in the amount T.

Figures 12, 13:
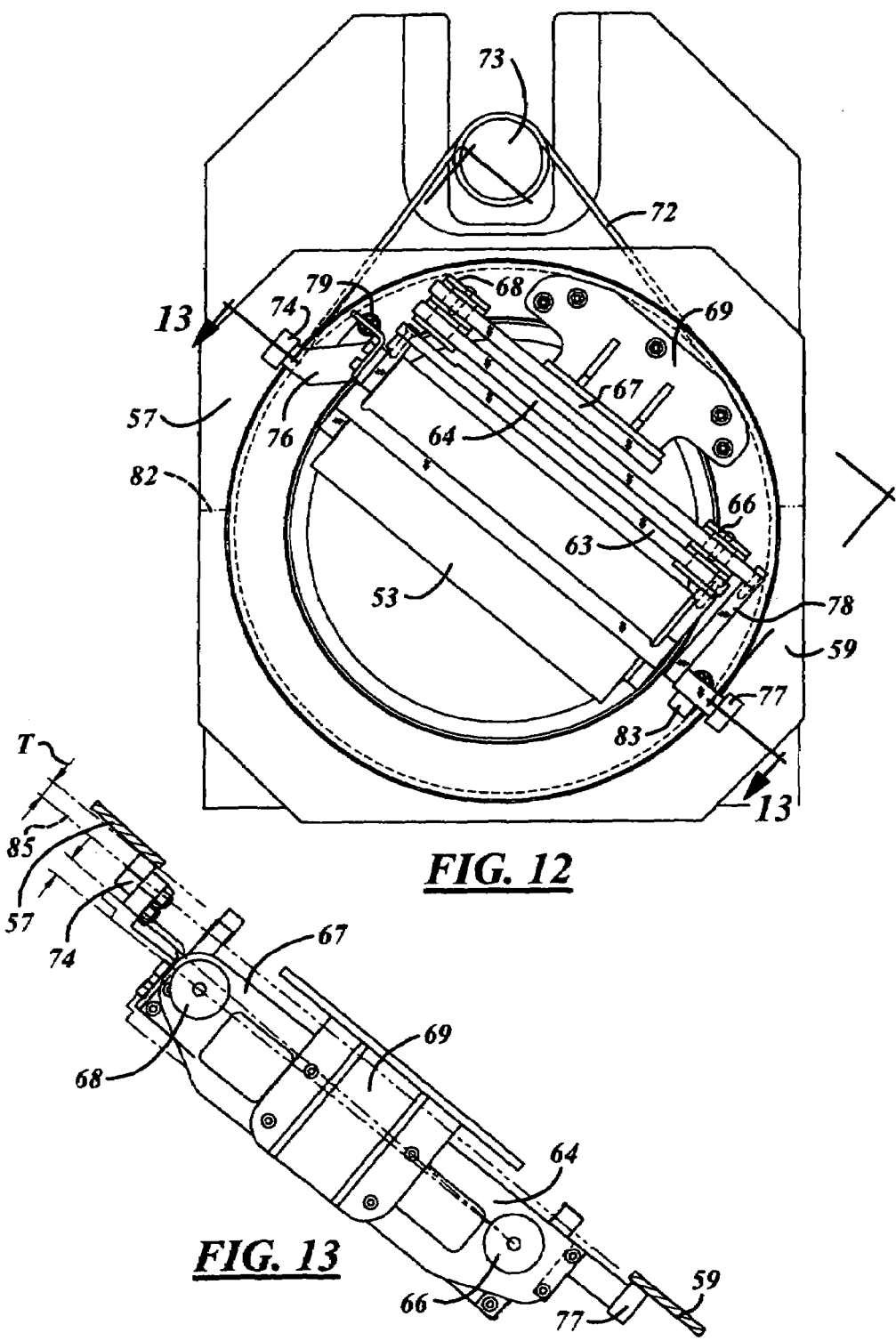
FIG. 12 is an end view of an A-axis roller rotated clockwise from the Home-position.
FIG. 13 is a top view of the A-axis roller of FIG. 12.

FIG. 12 is a front view of the A-axis roller and the A-axis roller support hardware showing the A-axis roller when it is rotated clockwise approximately 37 degrees. With the A-axis roller rotated to this position, the left side cam roller 74 is above the centerline 82 of the cam plate 56 and is supported on the upper cam surface 57. The right side cam roller 77 is below the centerline 82 of the cam plate 56 and is supported on the lower cam surface 59.

FIG. 13 is a view taken along lines 13-13 of FIG. 12 showing the cam rollers 74 and 77 when the A-axis roller is in the position shown in FIG. 12. The left side cam roller 74 is resting on the upper portion 57 of the cam plate 56, and the right side cam roller 77 is resting on the lower portion 59 of the cam plate 56. The upper portion 57 of the cam surface that supports the left side cam roller 74 is shown spaced from the reference line 85 designating the plane of the lower surface 59. The roller 74 is displaced from the plane of the lower surface 59 by an amount T, creating a tilt of the left end of the A-axis roller in the amount T.

Figure 14:
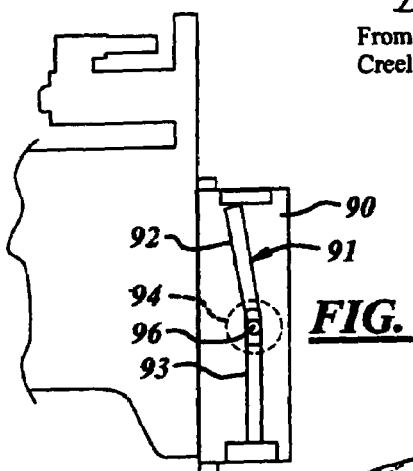
FIG. 14 is a side view of an alternate form of the invention in which cam slot plates are used to control the position of the A-axis rollers.

FIG. 14 is a side view of an alternate embodiment of the invention in which a cam slot plate 90 that is positioned on each side of the A-axis roller 94 is used to control the tilting of the A-axis roller 94. The cam slot plate 90 is formed with a cam slot 91 having an inclined upper portion 92 and a lower portion 93 that is normal to the K-axis of rotation. The inclined upper portion 92 is inclined at an angle of between 5 and 10 degrees to the orientation of the lower portion 93.

Figure 15:
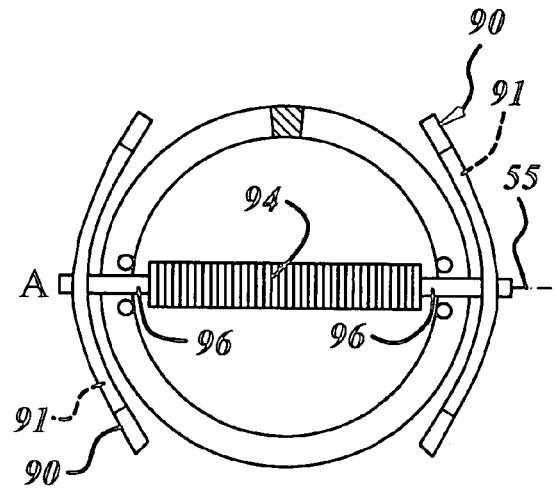
FIG. 15 shows the A-axis roller with the cam slot plates of FIG. 14.

FIG. 15 is an end view of the A-axis roller 94 showing the use of the cam slot plates 90 on either side of the A-axis roller to control the tilt of the A-axis roller. The A-axis roller 94 is mounted on roller shafts 96 that extend from the ends of the roller 94 and engage the cam slots 91 in the cam slot plates 90.

Figure 16:
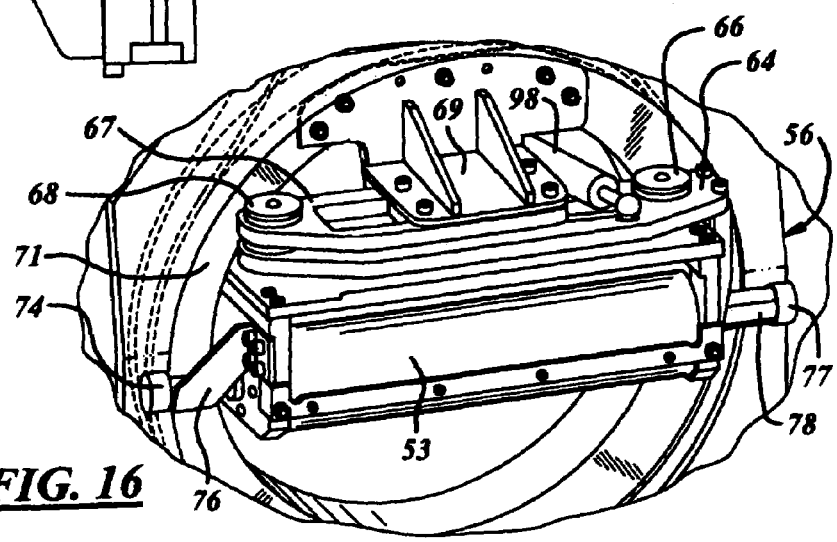
FIG. 16 is a perspective view of an alternate form of the invention in which a gas spring is used to bias the A-axis roller.

FIG. 16 shows an alternate embodiment of the invention in which a gas spring 98 is used to bias the rollers 74 and 77 onto the cam plate 56 instead of tension springs 79. The gas spring 98 is coupled to the center pivot plate 64. The other end of the gas spring 98 is coupled to a gas spring mounting bracket (not shown) that is mounted on the rear of the sprocket 71 and is similar to the support bracket 69. The gas spring mounting bracket provides a secure mount for the end of the gas spring 98 and allows the spring to draw the center pivot plate toward the sprocket so that the cam rollers 74 and 77 will follow the contour of the cam plate 56.

Having thus described the invention, various modifications and alterations will occur to those skilled in the art, which modifications and alterations are intended to be within the scope of the invention as defined by the appended claims.

We claim:

1. A roller system for handling the fibers in a fiber placement machine, the fiber placement machine having a wrist with a longitudinal axis and a fiber placement head located at one end of the wrist, the roller system comprising:
   a J-axis roller spaced between the ends of the wrist,
   at least one K-axis roller located at one end of the wrist adjacent the fiber placement head,
   at least one A-axis roller located at the end of the wrist that is opposite the K-axis roller,
   a support for the A-axis roller that allows the axis of the A-axis roller to swivel relative to the longitudinal axis of the wrist, and,
   a guide for the A-axis roller that causes an end of the A-axis roller to tilt toward the J-axis roller when the A-axis roller swivels relative to the longitudinal axis of the wrist.

2. The roller system of claim 1 further comprising:
   a cam plate comprising the guide for the A-axis roller, the cam plate having a cam surface that controls the position of the ends of the A-axis roller.

3. The roller system of claim 2 further comprising:
   an upper portion and a lower portion comprising the cam surface;
   wherein the upper portion of the cam surface causes the end of the roller that swivels onto the upper portion to be displaced toward the J-axis roller.

4. The roller system of claim 3 wherein the upper portion of the cam surface causes the distance between the J-axis roller and the portion of the A-axis roller that is swiveled onto the upper portion to remain substantially unchanged as a result of the swiveling of the A-axis rollers.

5. The roller system of claim 3 wherein the lower portion of the cam surface causes the end of the A-axis roller that swivels onto the lower portion not to be displaced toward the J-axis roller.

6. The roller system of claim 3 wherein the swiveling of the A-axis roller is a function of the swiveling of the K-axis roller and wherein the swiveling of the K-axis roller is between 2 and 5 times as great as the swiveling of the A-axis roller.

7. A roller system for handling the fibers in a fiber placement machine, the fiber placement machine having a wrist with a roll axis and a fiber placement head located at one end of the wrist, the roller system comprising:
   a first roller spaced between the ends of the wrist,
   at least one second roller mounted to swivel relative to the roll axis and located at one end of the wrist adjacent the fiber placement head,
   a third roller located at the end of the wrist that is opposite the at least one second roller,
   a mounting assembly for the third roller that allows the third roller to swivel relative to the roll axis of the wrist, and,
   a control mechanism for the third roller that causes an end of the third roller to tilt toward the first roller when the third roller swivels relative to the roll axis of the wrist.

8. The roller system of claim 7 further comprising:
   a contoured surface comprising the control mechanism for the third roller, the contoured surface being in contact with the mounting assembly for the third roller.

9. The roller system of claim 8 further comprising:
   the contoured surface comprising an upper portion and a lower portion;
   wherein the upper portion of the contoured surface causes an end of the mounting assembly for the third roller that engages the upper portion to be tilted toward the first roller.

10. The roller system of claim 9 wherein the upper portion of the contoured surface causes the distance between the first roller and the end of the third roller that tilts toward the first roller to remain substantially unchanged as a result of the swiveling and tilting of the third roller.

11. The roller system of claim 9 wherein the lower portion of the contoured surface causes the end of the third roller that is supported by the end of the mounting assembly that engages the lower portion not to be tilted toward the first roller.

12. The roller system of claim 9 wherein the swiveling of the third roller is a function of the swiveling of the second roller and wherein the swiveling of the second roller is between 2 and 5 times as great as the swiveling of the third roller.

13. The roller system of claim 9 wherein the ideal path of displacement of the end of the third roller that is tilted toward the first roller is an arc that passes through the axis of the third roller and has a center that is coincident with the center of the axis of the first roller.

14. The roller system of claim 13 wherein the ideal path of displacement may be approximated by a linear displacement.

15. The roller system of claim 9 further comprising:
   a cam plate comprising the contoured surface; and,
   cam rollers that are coupled to mounting assembly for the third roller, wherein the cam rollers ride on the surface of the cam plate.

16. The roller system of claim 15 wherein the cam rollers are biased onto the surface of the cam plate by tension springs.

17. The roller system of claim 15 wherein the cam rollers are biased onto the surface of the cam plate by gas springs.

18. The roller system of claim 9 wherein the upper portion of the contoured surface is inclined at between five and ten degrees to the lower portion of the cam plate.

19. The roller system of claim 9 further comprising:
   roller shafts that extend from the ends of the third roller; and,
   cam slot plates comprising the contoured surface, the cam slot plates having slots that engage the roller shafts to control the tilting of the third roller.

* * * * *